United States Patent
Thomason et al.

(10) Patent No.: US 12,256,284 B2
(45) Date of Patent: Mar. 18, 2025

(54) CONTROLLER DEVICE BASED VARYING VIRTUAL FENCING

(71) Applicant: INTERNATIONAL BUSINESS MACHINES CORPORATION, Armonk, NY (US)

(72) Inventors: Lowell Thomason, Byron, MN (US); Jessica Wandrey, Kasson, MN (US); Mark E. Maresh, Oro Valley, AZ (US); Richard Burton Finch, New Paltz, NY (US); Bradley Smoley, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 617 days.

(21) Appl. No.: 17/453,929

(22) Filed: Nov. 8, 2021

(65) Prior Publication Data
US 2023/0148175 A1     May 11, 2023

(51) Int. Cl.
| | | |
|---|---|---|
| *H04W 4/021* | (2018.01) | |
| *G06Q 10/083* | (2023.01) | |
| *H04W 4/029* | (2018.01) | |
| *H04W 4/35* | (2018.01) | |

(52) U.S. Cl.
CPC .......... *H04W 4/022* (2013.01); *G06Q 10/083* (2013.01); *H04W 4/029* (2018.02); *H04W 4/35* (2018.02)

(58) Field of Classification Search
CPC ............. H04W 4/02–029; H04W 4/35; H04W 12/104; H04W 12/60–64; G06Q 10/083; G06Q 10/0833; G06Q 50/28
See application file for complete search history.

(56) References Cited

U.S. PATENT DOCUMENTS

| | | |
|---|---|---|
| 7,173,535 B2 | 2/2007 | Bach et al. |
| 8,924,536 B1 * | 12/2014 | Barbeau ............... H04W 4/029 709/224 |
| 9,285,484 B2 | 3/2016 | Shima |

(Continued)

FOREIGN PATENT DOCUMENTS

| | | |
|---|---|---|
| EP | 3680687 A1 | 7/2020 |
| WO | 2003069363 A3 | 8/2003 |

OTHER PUBLICATIONS

Kappos 1351 OG 212 (Feb. 23, 2010) (Year: 2010).*

(Continued)

*Primary Examiner* — Ronald Eisner
(74) *Attorney, Agent, or Firm* — Tihon Poltavets

(57) ABSTRACT

A method for managing a virtual fence for a secondary device with respect to a controller device includes activating the controller device associated with a first object and a secondary device associated with a second object. The method includes establishing the virtual fence for the controller device and the secondary device, where the first virtual fence surrounds the secondary device and the controller device is positioned within the first virtual fence. The method includes receiving, from the controller device, a ping with location information for the controller device and the secondary device. The method includes, responsive to determining an adjustment to the first virtual fence is required, adjusting the first virtual fence based on a movement of the secondary device from a first location to a second location.

20 Claims, 9 Drawing Sheets

(56) References Cited

U.S. PATENT DOCUMENTS

| | | |
|---|---|---|
| 9,408,031 B1 | 8/2016 | Steger et al. |
| 9,615,545 B2 | 4/2017 | Rich |
| 9,668,097 B2 | 5/2017 | Myllymaki |
| 9,693,536 B1 | 7/2017 | Dana |
| 2007/0113797 A1 | 5/2007 | Mainini et al. |
| 2010/0139576 A1 | 6/2010 | Kim et al. |
| 2012/0306660 A1 | 12/2012 | Stopel |
| 2016/0078742 A1 | 3/2016 | Fernandez |
| 2017/0132547 A1 | 5/2017 | Myers |
| 2018/0199152 A1 | 7/2018 | Chang |
| 2019/0037345 A1* | 1/2019 | Gao .................... H04W 4/022 |

OTHER PUBLICATIONS

Halo, "Hello, Halo, The greatest innovation in fences since . . . fences!", Features—Halo with Cesar Millan, accessed May 13, 2021, pp. 1-14.

https://www.minnkotamotors.com/learn/technology/trolling-motors/i-pilot, "I-Pilot GPS Trolling Motor Sytem", accessed May 13, 2021, pp. 1-7.

Mell et al., "The NIST Definition of Cloud Computing", National Institute of Standards and Technology, Special Publication 800-145, Sep. 2011, pp. 1-7.

International Searching Authority, "Notification of International Search Report and Written Opinion or Declaration", International Application No. PCT/IB2022/060630, Mailed Feb. 6, 2023, 11 pages.

Thomason et al., "Controller Device Based Varying Virtual Fencing", International Application No. PCT/IB2022/060630, International Filing Date: Nov. 4, 2022, 43 pages.

\* cited by examiner

CONTROLLER DEVICE BASED VARYING VIRTUAL FENCING

BACKGROUND

This disclosure relates generally to virtual fencing and in particular to, managing a virtual fence for a secondary device with respect to a controller device.

A geofence is a virtual perimeter that defines a geographical area utilizing positioning devices and networks, such as, global positioning systems (GPS), radio-frequency identification (RFID), wireless networking technology, or cellular data. The virtual perimeter, also referred to as a virtual fence, can be stationary or nonstationary depending on an application, where a stationary virtual fence is associated with a physical location and a nonstationary virtual fence is associated with a device. A virtual fence is modifiable to user specification within customer sites, manufacturing facilities, and other secure areas to ensure objects or persons do not cross a perimeter as defined by the virtual fence.

SUMMARY

Embodiments in accordance with the present invention disclose a method, computer program product and computer system for managing a virtual fence for a secondary device with respect to a controller device, the method, computer program product and computer system can activate a controller device associated with a first object and a secondary device associated with a second object. The method, computer program product and computer system can establish a first virtual fence for the controller device and the secondary device, wherein the first virtual fence surrounds the secondary device and the controller device is positioned within the first virtual fence. The method, computer program product and computer system can receive, from the controller device, a ping with location information for the controller device and the secondary device. The method, computer program product and computer system can, responsive to determining an adjustment to the first virtual fence is required, adjust the first virtual fence based on a movement of the secondary device from a first location to a second location.

DETAILED DESCRIPTION

Embodiments of the present invention manage a virtual fence for a secondary device with respect to a controller device. The virtual fence for the secondary device is nonstationary and relocatable as secondary device travels between locations. The controller device represents a primary device associated with the secondary device, where the controller device and secondary device are to remain together while traveling between locations. The virtual fence for the secondary device represents a virtual perimeter and define an area in which the controller device is to remain while traveling between locations. For multiple secondary devices associated with the controller device, embodiments of the present invention can establish an overall virtual fence based on each virtual fence for each secondary device from the multiple secondary devices. Since each virtual fence for each secondary device from the multiple secondary devices is nonstationary and relocatable, the overall virtual fence is also nonstationary and relocatable as the multiple secondary devices travel between locations. Furthermore, a distance between each of the multiple secondary devices is varying, resulting in a shifting (i.e., dimension altering) of the overall virtual fence for the multiple secondary devices with respect to the secondary device. For multiple secondary devices associated with multiple controller devices, embodiments of the present invention can establish an overall virtual fence based on each virtual fence for each secondary devices from the multiple secondary devices. In the event a virtual fence for a secondary device associated with the controller interests with a static virtual fence, embodiments of the present can modify (e.g., shape, dimensions) the virtual fence for the secondary device based on the static virtual fence.

Figure 1:
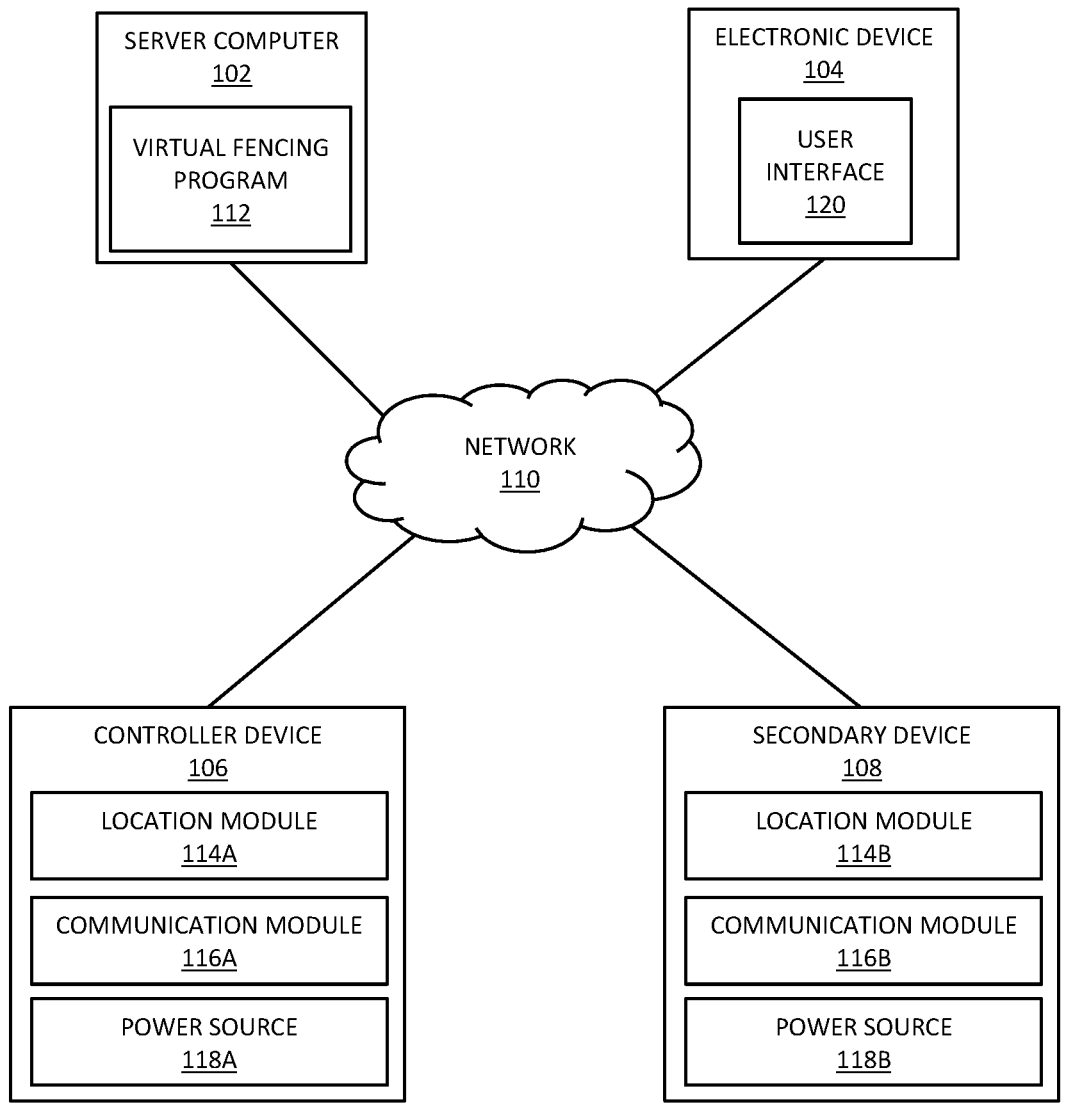
FIG. 1 is a functional block diagram illustrating a distributed data processing environment, in accordance with an embodiment of the present invention.

FIG. 1 is a functional block diagram illustrating a distributed data processing environment, in accordance with one embodiment of the present invention. The distributed data processing environment includes server computer 102, electronic device 104, controller device 106, and secondary device 108 all interconnected over network 110.

Server computer 102 may be a desktop computer, a laptop computer, a tablet computer, a specialized computer server, a smartphone, or any computer system capable of executing the various embodiments of virtual fencing program 112. In certain embodiments, server computer 102 represents a computer system utilizing clustered computers and components that act as a single pool of seamless resources when accessed through network 110, as is common in data centers and with cloud computing applications. In general, server computer 102 is representative of any programmable electronic device or combination of programmable electronic devices capable of executing machine-readable program instructions and communicating with other computer devices via a network. In this embodiment, server computer 102 has the ability to communicate with other computer devices to query the computer devices for information. Server computer 102 includes virtual fencing program 112 for managing a virtual fence for a secondary device with respect to a controller device.

Electronic device 104 can be a laptop computer, a tablet computer, a smart phone, smart watch, a smart speaker, or any programmable electronic device capable of communicating with various components and devices within distributed data processing environment, via network 110. In general, electronic device 104 represents one or more programmable electronic devices or combination of programmable electronic devices capable of executing machine readable program instructions and communicating with other computing devices (not shown) within distributed data processing environment via a network, such as network 110. In one embodiment, a user of electronic device 104 is associated with controller device 106 and secondary device 108, where the user of electronic device 104 is monitoring a shipment with a primary package with controller device 106 and a secondary package with secondary device 108. In another embodiment, a user of electronic device 104 is associated with controller device 106 and secondary device 108, where the user of electronic device 104 is monitoring a server rack with controller device 106 and a server component with secondary device 108, installed on the server rack with controller device 106. Electronic device 104 includes an instance of user interface 120 for interacting with virtual fencing program 112.

Controller device 106 and secondary device 108 each represent an electronic device (e.g., IoT device) associated with relocatable objects. In one embodiment, controller device 106 is associated with a primary package and secondary device 108 is associated with a secondary package, where the primary package and the secondary package are part of a shipment being transported between an origin location and a destination location. In another embodiment, controller device 106 is associated with a server rack and secondary device 108 is associated with a server component on the server rack, where the server component is to remain with the server rack to avoid tampering. In yet another embodiment, controller device 106 is associated with a server rack and secondary device 108 is associated with a server component on the server rack, where the server component associated with secondary device 108 is not allowed to cross a static border (e.g., another country) due to local regulations pertaining to the server component. Controller device 106 and secondary device 108 can provide various data to virtual fencing program 112 via a ping (i.e., packet of data). Each ping of data can include a unique identifier for an object associated with controller device 106 or secondary device 108 (e.g., tracking number, object serial number), a unique identifier for controller device 106 or secondary device 108 (e.g., device serial number), a timestamp, and location information. Controller device 106 includes location module 114A, communication module 116A, and power source 118A. Secondary device 108 includes location module 114B, communication module 116B, and power source 118B. For discussion purposes, controller device 106 and secondary device 108 are two similar electronic devices, where virtual fencing program 112 designates a first electronic device as controller device 106 and a second electronic device as secondary device 108.

Location module 114A and 114B allows for virtual fencing program to receive location information for controller device 106 and secondary device 108 with every ping of data. Location module 114A and 114B can utilize Global Positioning System (GPS), radio-frequency identification (RFID) triangulation, and/or cellular triangulation to determine a location of controller device 106 and secondary device 108 and can send the location information to virtual fencing program 112 operating on server computer 102. The location information can include one or more of: GPS coordinates, a position in a structure (e.g., warehouse, manufacturing facility), a town/city, a county, a state, a region, a providence, and a country for each ping of the various data that virtual fencing program 112 receives. Communication module 116A and 116B allows for controller device 106 and secondary device 108 to communicate with virtual fencing program 112 on server computer 102, via network 110. Power source 118A and 118B represent one or more battery packs and/or hardware for hardwired power associated with controller device 106 and secondary device 108, respectively.

In general, network 110 can be any combination of connections and protocols that will support communications between server computer 102, electronic device 104, controller device 106, and secondary device 108. Network 110 can include, for example, a local area network (LAN), a wide area network (WAN), such as the internet, a cellular network, or any combination of the preceding, and can further include wired, wireless, and/or fiber optic connections. In one embodiment, virtual fencing program 112 can be a web service accessible via network 110 to a user of electronic device 104. In another embodiment, virtual fencing program 112 may be operated directly by a user of server computer 102.

Virtual fencing program 112 manages a virtual fence for secondary device 108 with respect to controller device 106. Virtual fencing program 112 activates controller device 106 by associating a first object with controller device 106 and activates secondary device 108 by associating a second object with secondary device 108. As mentioned above, in one embodiment the first object is a primary package of a shipment and the second object is a secondary package of the shipment, where the primary package and the secondary package are to remain together (i.e., within a vicinity to one another) during transit between an origin location and a destination location. In another embodiment, the first object is a server rack and the second object is a server component located on the server rack, where the server rack and the server component are to remain together during a predetermined life of a machine to avoid any tampering of the server component. Virtual fencing program 112 establishes a virtual fence for controller device 106 and secondary device 108, where the virtual fence surrounds secondary device 108 and controller device 106 is positioned within an area defined by the virtual perimeter of the virtual fence. The virtual fence surrounding secondary device 108 is nonstationary and moves with secondary device 108, where primary device 106 is to remain withing the virtual fence surrounding secondary device 108.

Virtual fencing program 112 receives a ping with data from controller device 106 with location information for controller device 106 with respect to the virtual fence of secondary device 108. Alternatively, virtual fencing program 112 receives a ping with data from both, controller device 106 and secondary device 108, with location information, where virtual fencing program 112 can determine a location of secondary device 108 with respect to primary device 106. Virtual fencing program 112 determines whether an adjustment to the virtual fence for controller device 106 and secondary device 108 is required. In the event, virtual fencing program 112 determines an adjustment to the virtual fence for controller device 106 and secondary device 108 is required, virtual fencing program 112 adjusts the virtual fence for controller device 106 and secondary device 108. In the event, virtual fencing program 112 determines an adjustment to the virtual fence for controller device 106 and secondary device 108 is not required, virtual fencing program 112 determines whether the virtual fence was breached by controller device 106. In the event, virtual fencing program 112 determines the virtual fence was breached by controller device 106, virtual fencing program 112 sends a notification to client device 104 associated with the user. In the event, virtual fencing program 112 determines the virtual fence was not breached by controller device 106, virtual fencing program 112 reverts to receiving another ping with data from controller device 106 with location information for controller device 106 with respect to the virtual fence of secondary device 108.

User interface 120 enables a user to make requests of or issue commands to electronic device 104 and receive information and instructions in response. In one embodiment, a user of electronic device 104 accesses user interface 120 via voice commands in natural language. In one embodiment, user interface 120 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. In another embodiment, user interface 120 may also be mobile application software. In an example, mobile application software, or an "app," is a computer program designed to run on smart phones, tablet computers and other mobile devices. User interface 120 enables a user of electronic device 104 to interact with virtual fencing program 112.

Figure 2:
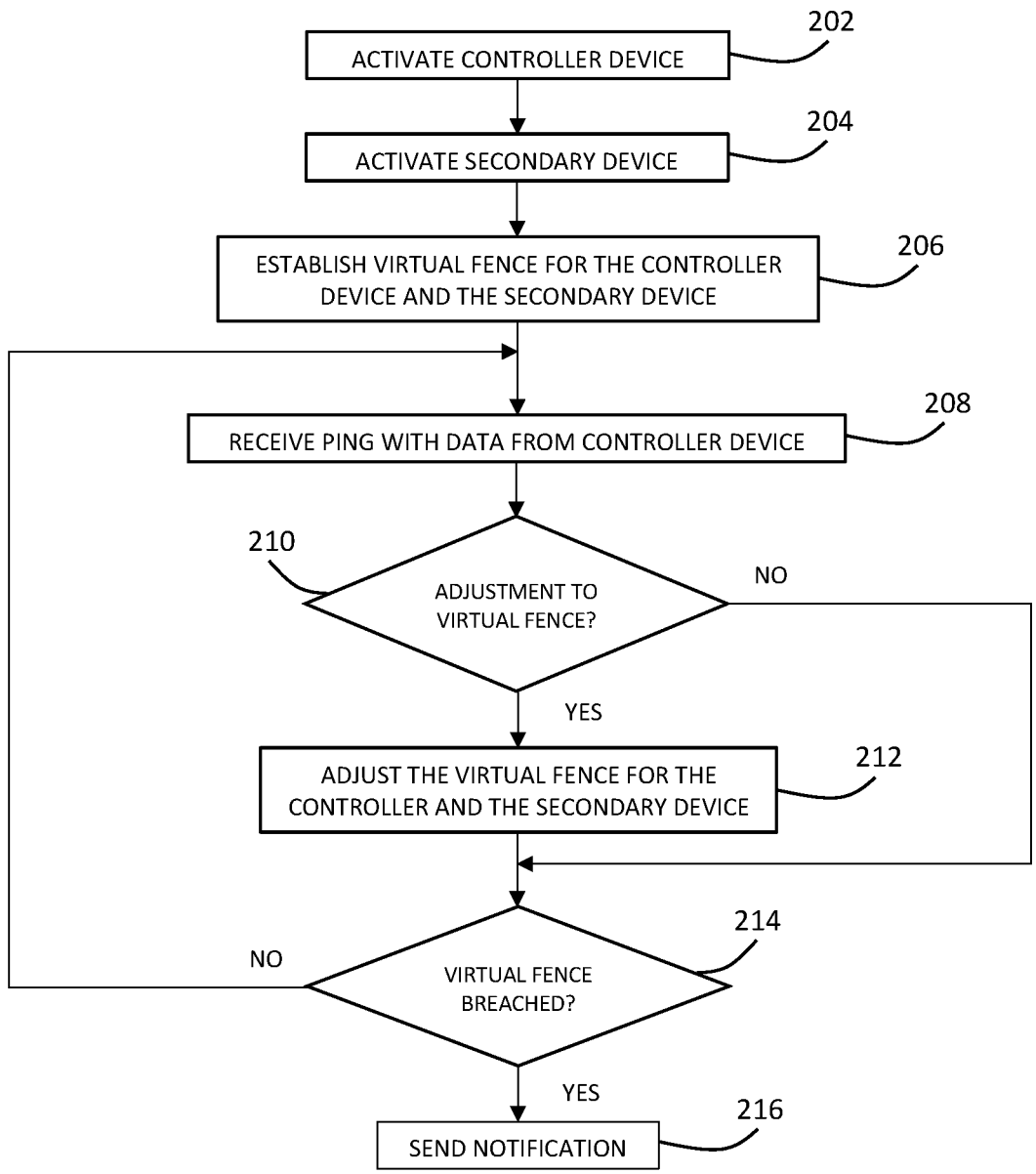
FIG. 2 is a flowchart depicting operational steps of a virtual fencing program for managing a virtual fence for a secondary device with respect to a controller device, in accordance with an embodiment of the present invention.

FIG. 2 is a flowchart depicting operational steps of a virtual fencing program for managing a virtual fence for a secondary device with respect to a controller device, in accordance with an embodiment of the present invention.

Virtual fencing program 112 activates controller device (202). The controller device represents an electronic device capable of sending, via a communication module, location information captured by a location module to virtual fencing program 112. Virtual fencing program 112 activates the controller device by associating a unique identifier (e.g., product serial number, tracking number) for an object with a unique identifier (e.g., device serial number) for the controller device. In one embodiment, virtual fencing program 112 associates a primary package of a shipment with a controller device utilizing a tracking number for the primary package and a serial number for the controller device. The controller device includes a battery power source to allow for the controller device to capture and send location information to virtual fencing program 112, without relying on an external power source. The shipment includes the primary package and a secondary package, where the secondary package is associated with the secondary device, discussed in further detail with regards to (204). Virtual fencing program 112 utilizes the controller device and secondary device to monitor a shipment of the primary package and the secondary package to determine if the two packages separate in transit between an origin location and a destination location. In another embodiment, virtual fencing program 112 associates a server rack installed in a data center with a controller device utilizing a serial number for the server rack and a serial number for the controller device. The controller device includes a hardwired power source to allow for the controller device to capture and send location to virtual fencing program 112. The server rack includes multiple server components installed on the server rack, where each of the multiple server components are associated with a secondary device, discussed in further detail with regards to (204). Virtual fencing program 112 can utilize the controller device and secondary device to monitor the server rack to determine if the server rack is tampered with by identifying if any of the multiple server components are removed from the server rack. Virtual fencing program 112 can also utilize the controller device and secondary device to monitor the server rack to determine if any of the multiple server components approach a static virtual fence (e.g., country border), where a specific server component from the multiple server components is not allowed (e.g., missing certification) due to local regulations pertaining to the specific server component.

Virtual fencing program 112 activates secondary device (204). Similar to a controller device, the secondary device represents an electronic device capable of sending, via a communication module, location information captured by a location module to virtual fencing program 112. The secondary device can send the location information directly to virtual fencing program 112 or the secondary device can send the location information to virtual fencing program 112 via the controller device. Virtual fencing program 112 activates the controller device by associating a unique identifier (e.g., product serial number, tracking number) for another object with a unique identifier (e.g., device serial number) for the secondary device. In one embodiment, virtual fencing program 112 associates a secondary package of a shipment with a controller device utilizing a tracking number for the secondary package and a serial number for the secondary device. The secondary device includes a battery power source to allow for the controller device to capture and send location information to virtual fencing program 112, without relying on an external power source. In another embodiment, virtual fencing program 112 associated a server component installed on a server rack in a data center with a secondary device utilizing a serial number for the server component and a serial number for the secondary device. The secondary device includes a hardwired power source to allow for the secondary device to capture and send location to virtual fencing program 112. If the server rack includes multiple server components installed on the server rack, virtual fencing program 112 activates a secondary device for each of the multiple server components.

Virtual fencing program 112 establishes a virtual fence for the controller device and the secondary device (206). In one embodiment, virtual fencing program 112 establishes a virtual fence for a secondary device, where a virtual perimeter of the virtual fence defines an area in which a primary device is to remain for a user defined period of time. In another embodiment, virtual fencing program 112 establishes a virtual fence for each of a plurality of secondary devices and establishes an overall virtual fence to encompass each virtual fence for each of the plurality of secondary devices. A virtual perimeter of the overall virtual fence defines an area in which a primary device is to remain for a user defined period of time. In yet another embodiment, virtual fencing program 112 establishes a first virtual fence for the controller device and a second virtual fence for the secondary device, where an overlapping first virtual fence and second virtual fence indicate that the controller device is within a vicinity of the secondary device.

Virtual fencing program 112 can receive, via an input in a user interface, one or more parameters for one or more virtual fences for the controller device and one or more secondary devices. The one or more parameters for a virtual fence can include, a shape, dimensions, a deviation timer, a deviation distance, and an activation period. Virtual fencing program 112 can receives a user drawn shape for each virtual fence, a user selection of a predetermined shape (e.g., square) for each virtual fence, and/or a user inputted global positioning system (GPS) coordinates defining various points of a virtual fence. Virtual fencing program 112 can receive dimensions for a drawn shape or selected shape for each of the virtual fences. In one example, the dimensions for a virtual fence are based on a perimeter of a warehouse facility in which the secondary device located, where the primary device cannot leave the warehouse (i.e., breach the virtual fence). In another example, the dimensions for a virtual fence are distance based, where the virtual fence of the secondary device is square shaped with a length of 500 feet for each side and the controller device cannot breach the square shaped virtual fence. Virtual fencing program 112 can receive a user defined deviation timer (e.g., ten minutes) represent a set amount of time for which the controller device can breach a virtual fence without triggering a notification. Virtual fencing program 112 can receive a user defined deviation distance (e.g., 100 feet) for which the controller device can breach a virtual fence to trigger a notification, even if a portion of time (e.g., five minutes) remains in the deviation timer (e.g., ten minutes). Virtual fencing program 112 can receive a user defined activation period, where the activation period is based on a set time period (e.g., 24 hours, infinite), based on a remaining power source of the controller device and/or secondary device, and/or based on a transit time between an origin location and a destination location.

Virtual fencing program 112 receives a ping with data from the controller device (208). Virtual fencing program 112 receives a ping with data from the controller device in predetermined or user defined intervals (e.g., twenty minutes). The predetermined or user defined intervals can be based on an amount of remaining battery power for the controller device, to ensure the controller device can ping data to virtual fencing program 112 for a desired duration (e.g., expected transit time between an origin location and a destination location). The predetermined or user defined intervals can be reduced (e.g., five seconds versus twenty minutes) for a controller device utilizing hardwired power. A location module on each of, the controller device and the secondary device utilize GPS and/or cellular triangulation to gather location information for each of the controller device and the secondary device and sends the data to virtual fencing program 112. The data includes location information with one or more of: GPS coordinates, a position in a structure (e.g., warehouse, manufacturing facility), a town/city, a county, a state, a region, a providence, and a country, for the controller device and the secondary device. In this embodiment, virtual fencing program 112 receives a ping with data from the controller device that includes location information of the controller device with respect to the secondary device. In another embodiment, virtual fencing program 112 receives a ping with data from the controller device that includes location information of the controller device with respect to the secondary device and location information of the secondary device with respect to a static virtual fence (e.g., country border). In yet another embodiment, virtual fencing program 112 receives a ping with data from the controller device and the secondary device, where the data includes location information for the controller device and the secondary device. Virtual fencing program 112 utilizes the location information from the controller device and the secondary device to determine whether an adjustment to the virtual fence is required and whether the virtual fence was breached by the controller device.

Virtual fencing program 112 determines whether an adjustment to the virtual fence for the controller device and the secondary device is required (decision 210). In the event virtual fencing program 112 determines an adjustment to the virtual fence for the controller device and the secondary device is required ("yes" branch, decision 210), virtual fencing program 112 adjusts the virtual fence for the controller device and the secondary device (212). In the event virtual fencing program 112 determines an adjustment to the virtual fence for the controller device and the secondary device is not required ("no" branch, decision 210), virtual fencing program 112 determines whether the virtual fence was breached by the controller device (decision 214).

Virtual fencing program 112 determines whether an adjustment to the virtual fence for the controller device and the secondary device is required based on a movement of the secondary device from a first location to a second location. In one embodiment, virtual fencing program 112 receives a ping with data from a controller device indicating the virtual fence for the controller device and the secondary device is to include another virtual fence associated with another secondary device. Virtual fencing program 112 determines an adjustment to the virtual fence for the controller device and the secondary device is required to ensure an overall virtual fence considers an individual virtual fence for each of the two secondary devices. An example of this embodiment is discussed in further detail with regards to FIG. 4. In another embodiment, virtual fencing program 112 receives a ping with data from a controller device indicating the virtual fence for the controller device and the secondary device is to include another virtual fence associated with another controller device and another secondary device. Virtual fencing program 112 determines an adjustment to the virtual fence for the controller device and the secondary device is required to ensure an overall virtual fence considers an individual virtual fence for each controller device and secondary device combination. An example of this embodiment is discussed in further detail with regards to FIG. 5. In yet another embodiment, virtual fencing program 112 receives a ping with data from a controller device indicating that a portion of the virtual fence for the controller device and the secondary device has breached a static virtual fence, where the controller device and/or the secondary device is not allowed to cross the static virtual fence. Virtual fencing program 112 determines an adjustment to the virtual fence for the controller device and the secondary device is required to ensure the portion of the virtual fence no longer breaches the static virtual fence and to ensure that controller device and/or the secondary device do not cross the static virtual fence. An example of this embodiment is discussed in further detail with regards to FIGS. 6A-6C.

Virtual fencing program 112 adjusts the virtual fence for the controller device and the secondary device (212). Virtual fencing program 112 can adjust a location of the virtual fence for the controller device and the secondary device based on a movement of the controller device and/or the secondary device. Virtual fencing program 112 can adjust x and y coordinates (i.e., latitude and longitude coordinates) for multiple points of the virtual fence as the controller device and secondary device move from a first location (e.g., city A) to a second location (e.g., city B). Virtual fencing program 112 can adjust the x and y coordinates, while maintaining a constant virtual perimeter for the virtual fence and resulting defined virtual area in which the controller device is to remain. Virtual fencing program 112 can adjust a distance range of a virtual fence (i.e., increase or decrease a virtual perimeter) for the controller device and the secondary device based on a location of the controller device and the secondary device. For example, virtual fencing program 112 receives location information indicating the controller device and secondary device are located in a cargo truck, where previous location information indicated the controller device and the secondary device were previously located in a shipment processing facility. Virtual fencing program 112 decreases a distance range for the virtual fence (i.e., decrease a virtual perimeter) for the controller device and the secondary device, since the controller device is to remain in closer proximity to the secondary device while on the cargo truck compared to while being handled in the shipment processing facility.

Virtual fencing program 112 can adjust the virtual fence for the controller device and the secondary device by combining the virtual fence for another controller device and another secondary device, to create an overall virtual fence for the two controller devices and the two secondary devices. Virtual fencing program 112 can instruct the two controller devices to synchronize utilizing a shared network (e.g., Wi-Fi, cellular) and determine an overall virtual perimeter for the two virtual fences of the two secondary devices. If the two virtual fences overlap, virtual fencing program 112 determines the overall virtual fence includes an outer virtual perimeter outlining the two overlapping virtual perimeters. If the two virtual fences do not overlap, virtual fencing program 112 determines a shape with dimensions for an overall virtual fence that encompasses the two virtual fences. To revert to two separate virtual fences from an overall virtual fence, virtual fencing program 112 can instruct the two controller devices to unsynchronized utilizing the shared network and determine a first virtual perimeter for the first virtual fence and a second virtual perimeter for the second virtual fence. Virtual fencing program 112 can adjust the virtual fence for the controller device and the secondary device upon encountering a static virtual fence by identifying a portion of the virtual fence that has intersected (i.e., crossed) the static virtual fence and removing that portion (i.e., area) from the virtual fence for the controller device and the secondary device.

Virtual fencing program 112 determines whether the virtual fence was breached by the controller device (decision 214). In the event virtual fencing program 112 determines the virtual fence was breached by the controller device ("yes" branch, decision 214), virtual fencing program 112 sends a notification to a client device associated with the user (216). In the event virtual fencing program 112 determines the virtual fence was not breached by the controller device ("no" branch, decision 214), virtual fencing program 112 reverts to receiving another ping with data from the controller device (208).

In one embodiment, virtual fencing program 112 determines a controller device has breached the virtual fence upon the controller device crossing a virtual perimeter of the virtual fence, indicating the controller device is no longer in a vicinity of the secondary device. In another embodiment, virtual fencing program 112 determines a controller device has breached the virtual fence upon the controller crossing a virtual perimeter of the virtual fence for a duration of a deviation timer. As previously discussed, the deviation timer allows for the controller device to breach the virtual fence for a predetermined amount of time (e.g., ten minutes) before virtual fencing program 112 determines the virtual has been breached by the controller device. In yet another embodiment, virtual fencing program 112 determines a controller device has breached the virtual fence upon the controller crossing a virtual perimeter of the virtual fence that meets or exceeds a deviation distance. As previously discussed, virtual fencing program 112 can utilize a combined deviation timer and a deviation distance from the virtual fence. For an instance where a deviation distance (e.g., 100 feet) is met and exceeded before a duration of a deviation timer is reached, virtual fencing program 112 determines the virtual fence was breached by the controller device.

Virtual fencing program 112 sends a notification to a client device associated with the user (216). In an embodiment where the controller device is associated with a primary package of a shipment and the secondary device is associated with a secondary package of the shipment, virtual fencing program 112 sends a notification stating the primary package and the secondary package have separated while in transit between an origin location and a destination location. Virtual fencing program 112 can provide one or more user selectable options within the notification that include but are not limited to: a request for a new shipment of a new primary package and/or a new secondary package, a request for an initialization of a return process for the primary package and/or the secondary package, and a request for additional details surrounding the breaching of the virtual fence by the controller device. If virtual fencing program 112 receives a user selection requesting a new shipment of a new primary package and/or a new secondary package, virtual fencing program 112 reverts to activating a new controller device (202) for the new primary package and performs the subsequent steps until the new shipment is delivered to the destination location. If virtual fencing program 112 receives a user selection requesting an initialization of a return process for the primary package and/or the secondary package, virtual fencing program 112 initializes the return process by providing the user one or more return procedures. If virtual fencing program 112 receives a user selection of requesting additional details surrounding the breaching of the virtual fence by the controller device, virtual fencing program 112 displays a map with the received ping of data from the controller device that resulted in virtual fencing program 112 determining the virtual fence was breached by the controller device. The map includes a position of the primary package (i.e., controller device), a position of the secondary package (i.e., secondary device), a virtual perimeter overlay for the virtual fence, and a description of how the virtual fence was breached (e.g., deviation distance was exceeded).

In an embodiment where a controller device is associated with a server rack and a secondary device is associated with a server component installed on the server rack, virtual fencing program 112 sends a notification stating the server rack and the server component have separated at a client site. The separation of the server component from the server rack indicates potential tampering of the server component and/or the server rack. Virtual fencing program 112 can provide one or more user selectable options within the notification that include but are not limited to: a request for an inspection of the server rack, a request to shut down the server rack, and a request for additional details surrounding the breaching of the virtual fence by the controller device. If virtual fencing program 112 receives a user selection requesting an inspection of the server rack, virtual fencing program 112 initializes an inspection by scheduling a client site visit by a specialist to perform an inspection of the server rack to determine a cause for the breaching of the virtual fence. If virtual fencing program 112 receives a user selection requesting a shut down of the server rack, virtual fencing program 112 initializes the shut down of the server rack to prevent any further tampering of the remaining server components on the server rack and/or any data stored on the server rack. If virtual fencing program 112 receives a user selection requesting additional details surrounding the breaching of the virtual fence by the controller device, virtual fencing program 112 displays a map with the received ping of data from the controller device that resulted in virtual fencing program 112 determining the virtual fence was breached by the controller device. The map includes a position of the server rack (i.e., controller device), a position of the server component (i.e., secondary device), a virtual perimeter overlay for the virtual fence, and a description of how the virtual fence was breached (e.g., the virtual fence no longer includes the server rack). It is to be noted, if the secondary device associated with the server component is utilizing a hardwired power source and the power source is severed, virtual fencing program 112 is no longer able to receive data for the secondary device. As a result, virtual fencing program 112 determines the virtual fence has been breached by the controller device associated with the server rack, since the controller device is not positioned within an area defined by the virtual fence that is no longer present.

In yet another embodiment, where a controller device is associated with a server rack and a secondary device is associated with a server component installed on the server rack, virtual fencing program 112 sends a notification stating the server component has breached a static border and an adjustment to the virtual fence was performed. The server component installed on the server rack breaching the static boarder indicates that the server component is entering a territory (e.g., country) where the server component fails to meet local regulations pertaining to a specific certification requirement. Virtual fencing program 112 can provide one or more user selectable options within the notification that include but are not limited to: a request to reroute the server rack, a request to prevent activation of the server component, and a request for additional details surrounding the breaching of the virtual fence by the controller device. If virtual fencing program 112 receives a user selection requesting to reroute the server rack with the installed component, virtual fencing program 112 reroutes a shipment of the server rack to another territory where the server component meets local regulations pertaining to a specific certification requirement. If virtual fencing program 112 receives a user selection requesting to prevent the activation of the server component, virtual fencing program 112 locks the server component and prevents the server components from powering on upon arrival at a client site. If virtual fencing program 112 receives a user selection requesting additional details surrounding the breaching of the virtual fence by the controller device, virtual fencing program 112 displays a map with the received ping of data from the controller device that resulted in virtual fencing program 112 determining the virtual fence was breached by the controller device. The map includes a position of the server rack (i.e., controller device), a position of the server component (i.e., secondary device), a virtual perimeter overlay for the virtual fence, and a description of how the virtual fence was breached (e.g., server component was crossing into a territory without proper certification).

Figure 3:
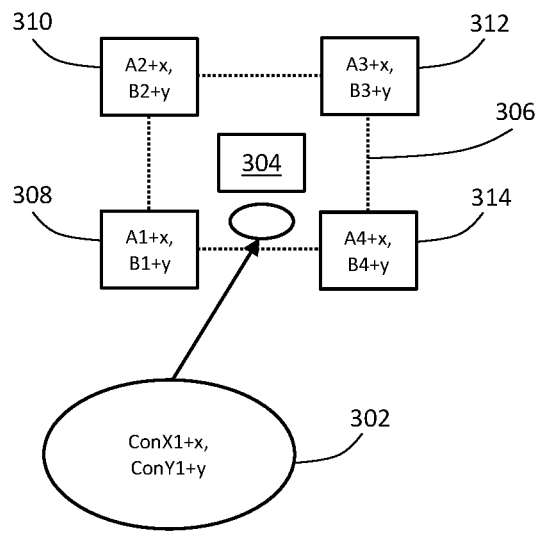
FIG. 3 illustrates an example of a virtual fence for a secondary device with respect to a controller device, in accordance with an embodiment of the present invention.

FIG. 3 illustrates an example of a virtual fence for a secondary device with respect to a controller device, in accordance with an embodiment of the present invention. In this example, controller device 302 is associated with a primary object and secondary device 304 is associated with a secondary object, where virtual fence 306 surrounds secondary device 304. Controller device 302 is positioned within an area of virtual fence 306 defined by a virtual perimeter, where virtual fence 306 is rectangular in shape. Coordinates 308, 310, 312, and 314 define each corner of the rectangular shaped virtual fence 306. Virtual fencing program 112 receives pings of data from controller device 302 and determines whether virtual fence 306 surrounding secondary device 304 was breached by controller device 302.

Figure 4:
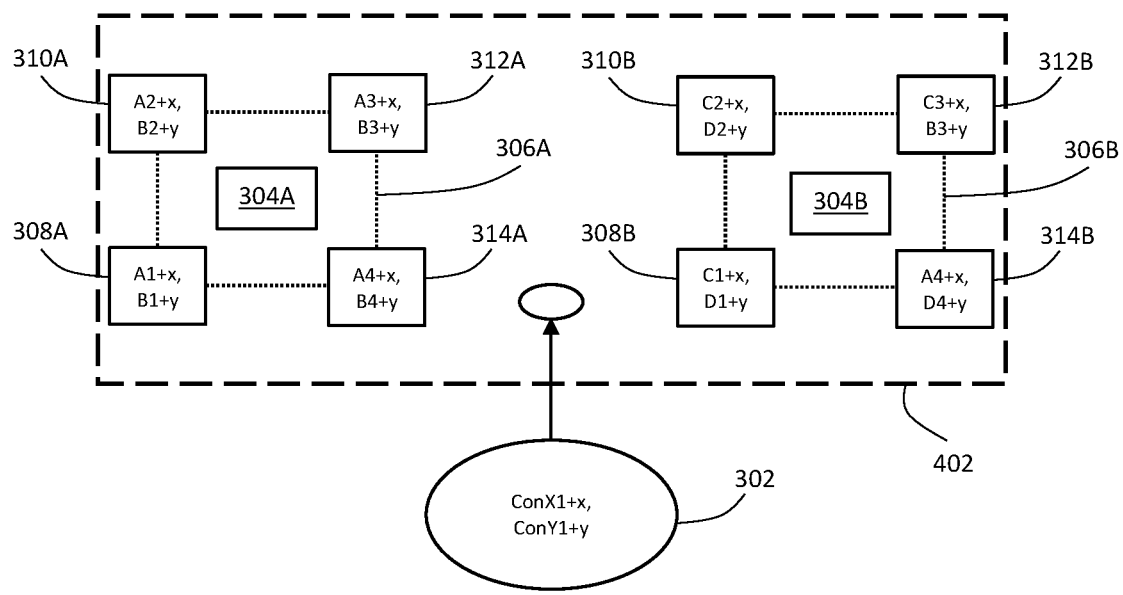
FIG. 4 illustrates an example of multiple virtual fences for multiple secondary devices with respect to a controller device, in accordance with an embodiment of the present invention.

FIG. 4 illustrates an example of multiple virtual fences for multiple secondary devices with respect to a controller device, in accordance with an embodiment of the present invention. In this example, controller device 302 is associated with a primary object and secondary device 304A and 304B are each associated with a secondary object, where virtual fence 306A surrounds secondary device 304A and virtual fence 306B surrounds secondary device 304B. Controller device 302 is positioned within an area of overall virtual fence 402 defined by a virtual perimeter, where overall virtual fence 402 encompasses virtual fence 306A and 306B. Coordinates 308A, 310A, 312A, and 314A define each corner of the rectangular shaped virtual fence 306A and coordinates 308B, 310B, 312B, and 314B define each corner of the rectangular shaped virtual fence 306B. Virtual fencing program 112 receives pings of data from controller device 302 and determines whether overall virtual fence 402 was breached by controller device 302 and/or by one or more of: secondary device 304A and secondary device 304B.

Figure 5:
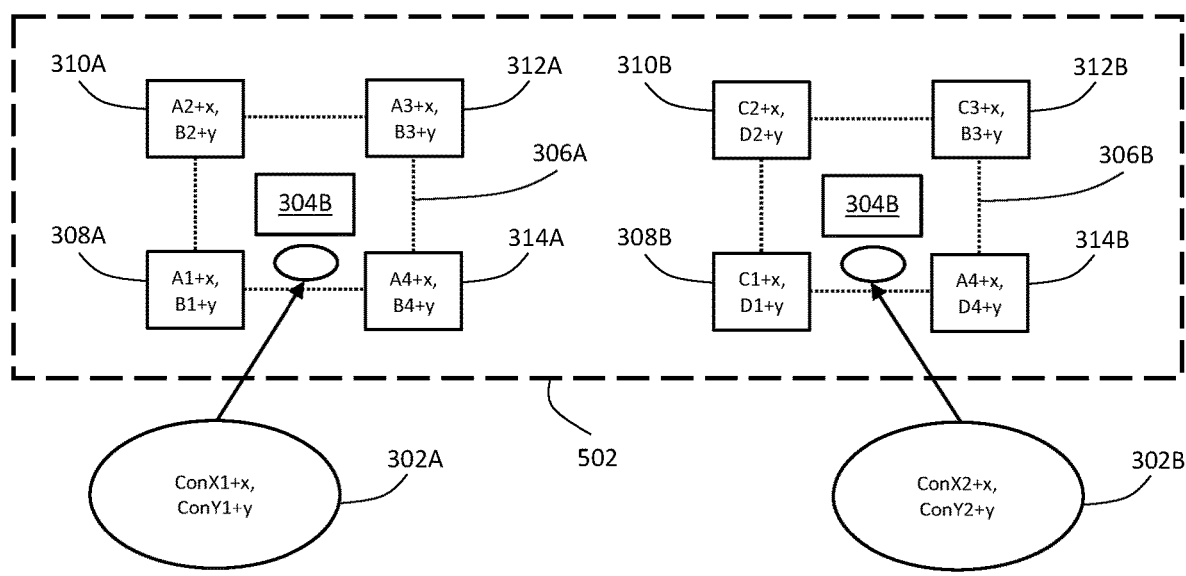
FIG. 5 illustrates an example of a shared virtual fence for multiple secondary devices associated with multiple controller devices, in accordance with an embodiment of the present invention.

FIG. 5 illustrates an example of a shared virtual fence for multiple secondary devices associated with multiple controller devices, in accordance with an embodiment of the present invention. In this example, controller device 302A and 302B are each associated with a primary object and secondary device 304A and 304B are each associated with a secondary object, where virtual fence 306A surrounds secondary device 304A and virtual fence 306B surrounds secondary device 304B. Though in the illustrated example controller device 302A is positioned within virtual fence 306A and controller device 302B within virtual fence 306B, controller device 302A and 302B can be positioned anywhere within overall virtual fence 502. Controller device 302A and 302B are positioned within an area of overall virtual fence 502 defined by a virtual perimeter, where overall virtual fence 502 encompasses virtual fence 306A and 306B. Coordinates 308A, 310A, 312A, and 314A define each corner of the rectangular shaped virtual fence 306A and coordinates 308B, 310B, 312B, and 314B define each corner of the rectangular shaped virtual fence 306B. Virtual fencing program 112 receives pings of data from controller device 302A and 302B, and determines whether overall virtual fence 502 was breached by one or more of: controller device 302A, controller device 302B and/or by one or more of: secondary device 304A and secondary device 304B.

Figure 6A:
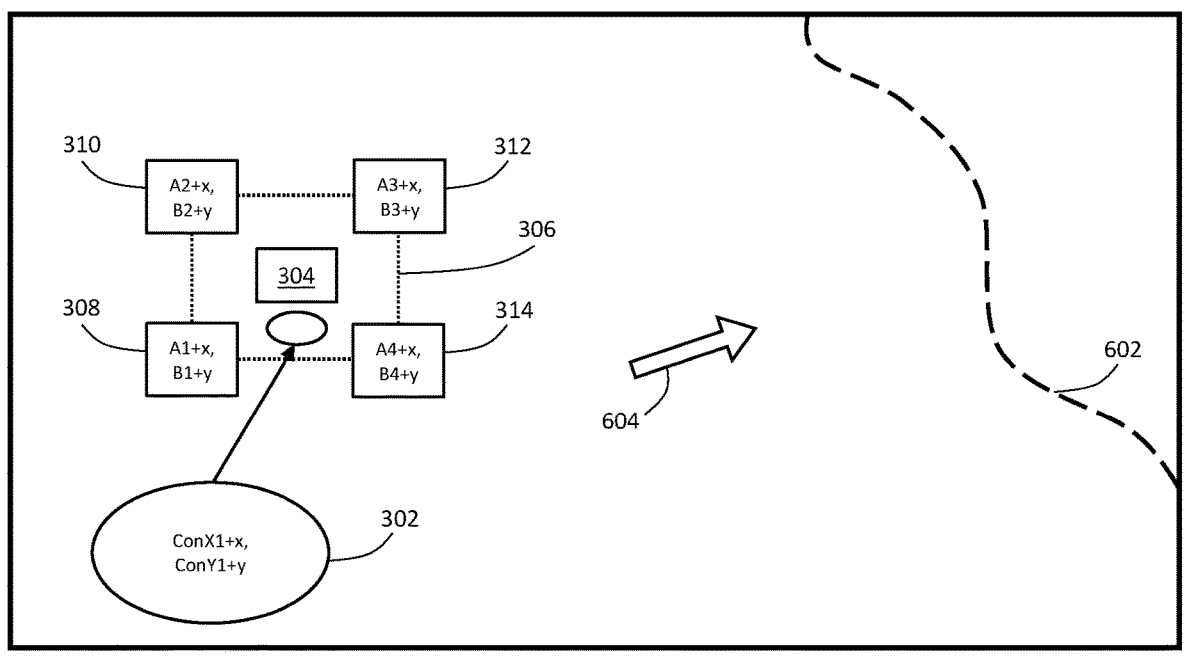
FIG. 6A illustrates an example of a secondary device with a modifiable virtual fence approaching a static virtual fence, in accordance with an embodiment of the present invention.

FIG. 6A illustrates an example of a secondary device with a modifiable virtual fence approaching a static virtual fence, in accordance with an embodiment of the present invention. In this example, controller device 302 is associated with a server rack being relocated from a first customer site to a second customer site and secondary device 304 is associated with a server component on the server rack, where virtual fence 306 surrounds secondary device 304. Controller device 302 is positioned within an area of virtual fence 306 defined by a virtual perimeter, where virtual fence 306 is rectangular in shape. Coordinates 308, 310, 312, and 314 define each corner of the rectangular shaped virtual fence 306. Static virtual fence 602 represents a fixed border between country A and country B, where the server rack with the server component is located in country A and approaching static virtual fence 602 in a direction indicated by arrow 604. The server component installed on the server rack includes various certifications but does not include a specific certification for operating in country B.

Figure 6B:
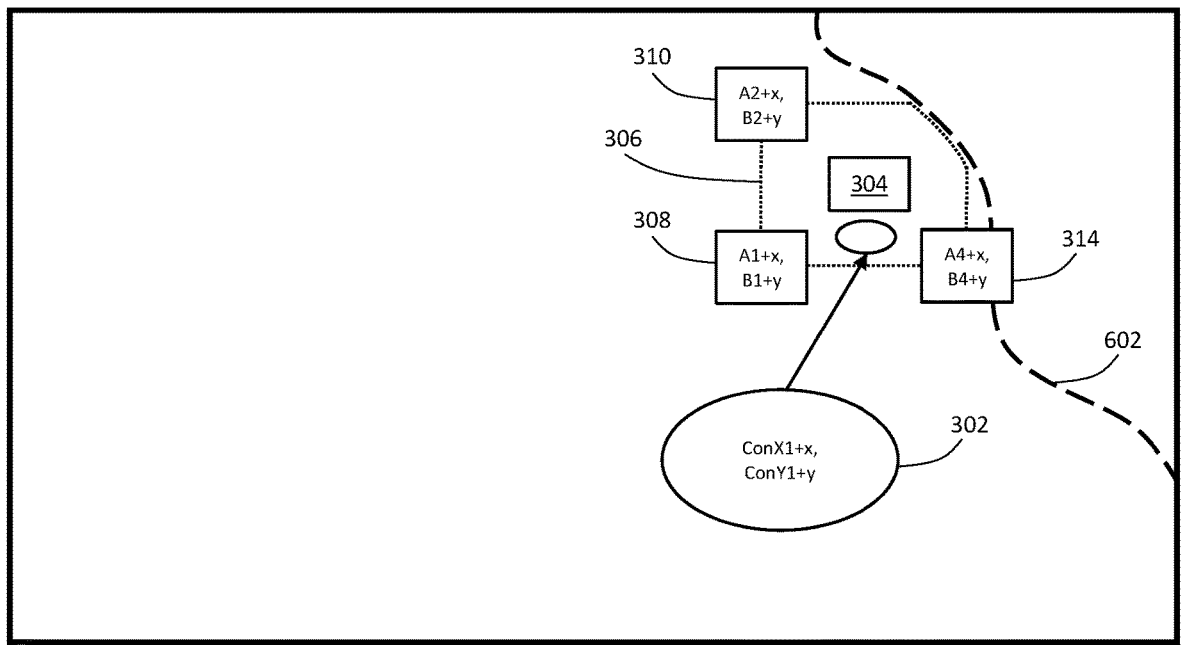
FIG. 6B illustrates an example of a secondary device with an altered modifiable virtual fence with respect to a static virtual fence, in accordance with an embodiment of the present invention.

FIG. 6B illustrates an example of a secondary device with an altered modifiable virtual fence with respect to a static virtual fence, in accordance with an embodiment of the present invention. In this example, virtual fence 306 for the server rack associated controller device 302 and the server component associated secondary device 304 interact with static virtual fence 602. Virtual fencing program 112 receives pings of data from controller device 302 and determines that an adjustment to virtual fence 306 for controller device 302 and secondary device 304 is required. Virtual fencing program 112 adjusts virtual fence 306 to conform to static virtual fence 306, where neither controller device 302 nor secondary device 304 can cross static virtual fence 306. Virtual fencing program 112 can reduce a size of virtual fence 306 while conforming to static virtual fence 602 but can include a re-sizing restriction, where the re-sizing of virtual fence 306 cannot reduce an original area as defined by the virtual perimeter of virtual fence 306 by more than a specified percentage (e.g., 50%). Though the server component associated with secondary device 304 cannot cross static virtual fence 306, the server component is installed on the server rack associated with controller device 302. Therefore, controller device 302 cannot cross static virtual fence 306 until the server component with secondary device 304 is uninstalled from the server rack. Furthermore, controller device 302 cannot cross a virtual perimeter of virtual fence 306 since the controller device 302 is to remain in a vicinity of secondary device 304, where the server component associated with the secondary device 304 is to remain installed on the server rack associated with controller device 302. As virtual fencing program 112 adjusts virtual fence 306 for controller device 302 and secondary device 304, coordinates 308, 310, and 314 of the formerly rectangular shaped virtual fence 306 remain.

Figure 6C:
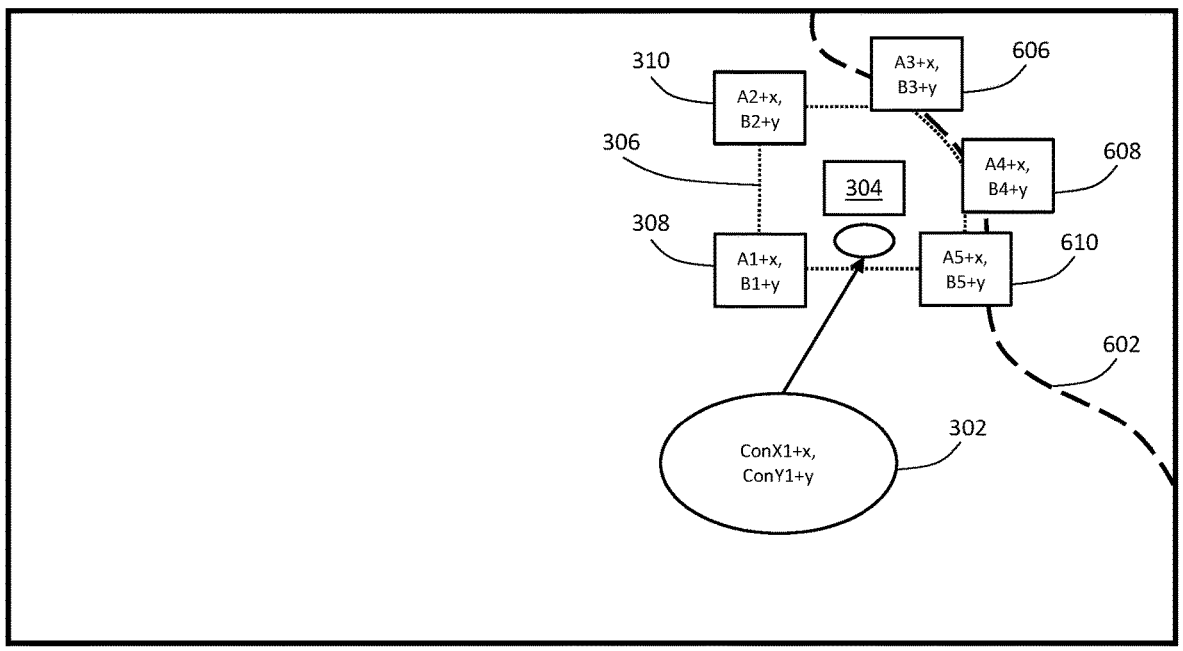
FIG. 6C illustrates an example of a secondary device with an altered modifiable virtual fence with respect to a static virtual fence and an additional definition point, in accordance with an embodiment of the present invention.

FIG. 6C illustrates an example of a secondary device with an altered modifiable virtual fence with respect to a static virtual fence and an additional definition point, in accordance with an embodiment of the present invention. In this example, virtual fencing program 112 adjusts virtual fence 306 for controller device 302 and secondary device 304 to include previous coordinates 308 and 310, along with new coordinates 606, 608, and 610. The combined coordinates of 308, 310, 606, 608, and 610 define a new shape of virtual fence 306 for controller device 302 and secondary device 304, since virtual fence 306 conforms to static virtual fence 602. In this embodiment, virtual fencing program 112 determines virtual fence 306 breached static virtual fence 602 and sends a notification indicating virtual fence 306 for controller device 302 and secondary device 304, breached static virtual fence 602. Additionally, virtual fencing program 112 provides one or more user selectable options within the notification that include but are not limited to: a request to reroute the server rack associated controller device 302, a request to prevent activation of the server component associated with secondary device 304, and a request for additional details surrounding the breaching of static virtual fence 602 by virtual fence 306.

Figure 7:
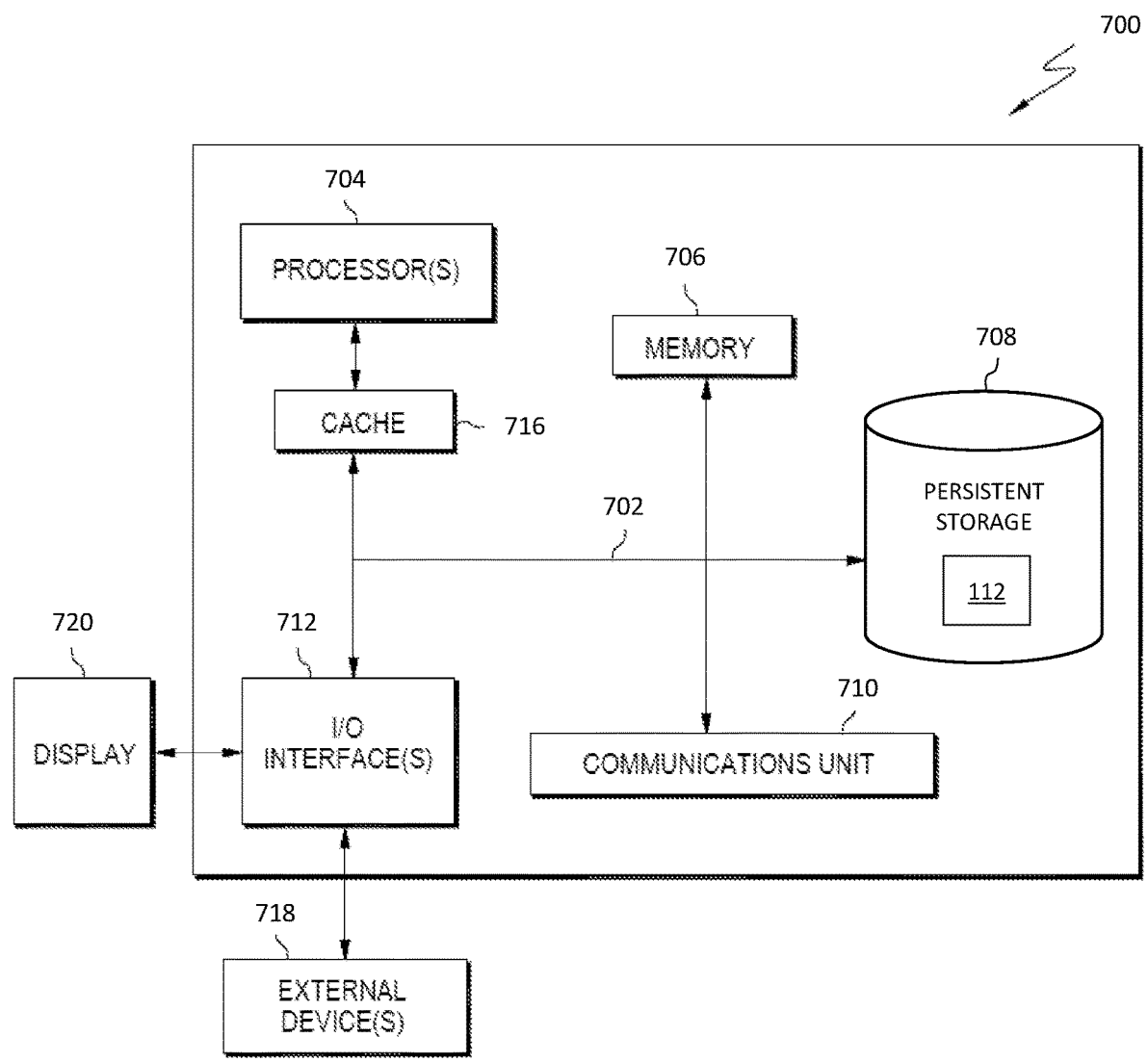
FIG. 7 is a block diagram of components of a computer system, such as the server computer of FIG. 1, in accordance with an embodiment of the present invention.

FIG. 7 depicts computer system 700, where server computer 102 is an example of a computer system 700 that includes virtual fencing program 112. The computer system includes processors 704, cache 716, memory 706, persistent storage 708, communications unit 710, input/output (I/O) interface(s) 712 and communications fabric 702. Communications fabric 702 provides communications between cache 716, memory 706, persistent storage 708, communications unit 710, and input/output (I/O) interface(s) 712. Communications fabric 702 can be implemented with any architecture designed for passing data and/or control information between processors (such as microprocessors, communications and network processors, etc.), system memory, peripheral devices, and any other hardware components within a system. For example, communications fabric 702 can be implemented with one or more buses or a crossbar switch.

Memory 706 and persistent storage 708 are computer readable storage media. In this embodiment, memory 706 includes random access memory (RAM). In general, memory 706 can include any suitable volatile or non-volatile computer readable storage media. Cache 716 is a fast memory that enhances the performance of processors 704 by holding recently accessed data, and data near recently accessed data, from memory 706.

Program instructions and data used to practice embodiments of the present invention may be stored in persistent storage 708 and in memory 706 for execution by one or more of the respective processors 704 via cache 716. In an embodiment, persistent storage 708 includes a magnetic hard disk drive. Alternatively, or in addition to a magnetic hard disk drive, persistent storage 708 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 708 may also be removable. For example, a removable hard drive may be used for persistent storage 708. Other examples include optical and magnetic disks, thumb drives, and smart cards that are inserted into a drive for transfer onto another computer readable storage medium that is also part of persistent storage 708.

Communications unit 710, in these examples, provides for communications with other data processing systems or devices. In these examples, communications unit 710 includes one or more network interface cards. Communications unit 710 may provide communications through the use of either or both physical and wireless communications links. Program instructions and data used to practice embodiments of the present invention may be downloaded to persistent storage 708 through communications unit 710.

I/O interface(s) 712 allows for input and output of data with other devices that may be connected to each computer system. For example, I/O interface 712 may provide a connection to external devices 718 such as a keyboard, keypad, a touch screen, and/or some other suitable input device. External devices 718 can also include portable computer readable storage media such as, for example, thumb drives, portable optical or magnetic disks, and memory cards. Software and data used to practice embodiments of the present invention can be stored on such portable computer readable storage media and can be loaded onto persistent storage 708 via I/O interface(s) 712. I/O interface (s) 712 also connect to display 720.

Display 720 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
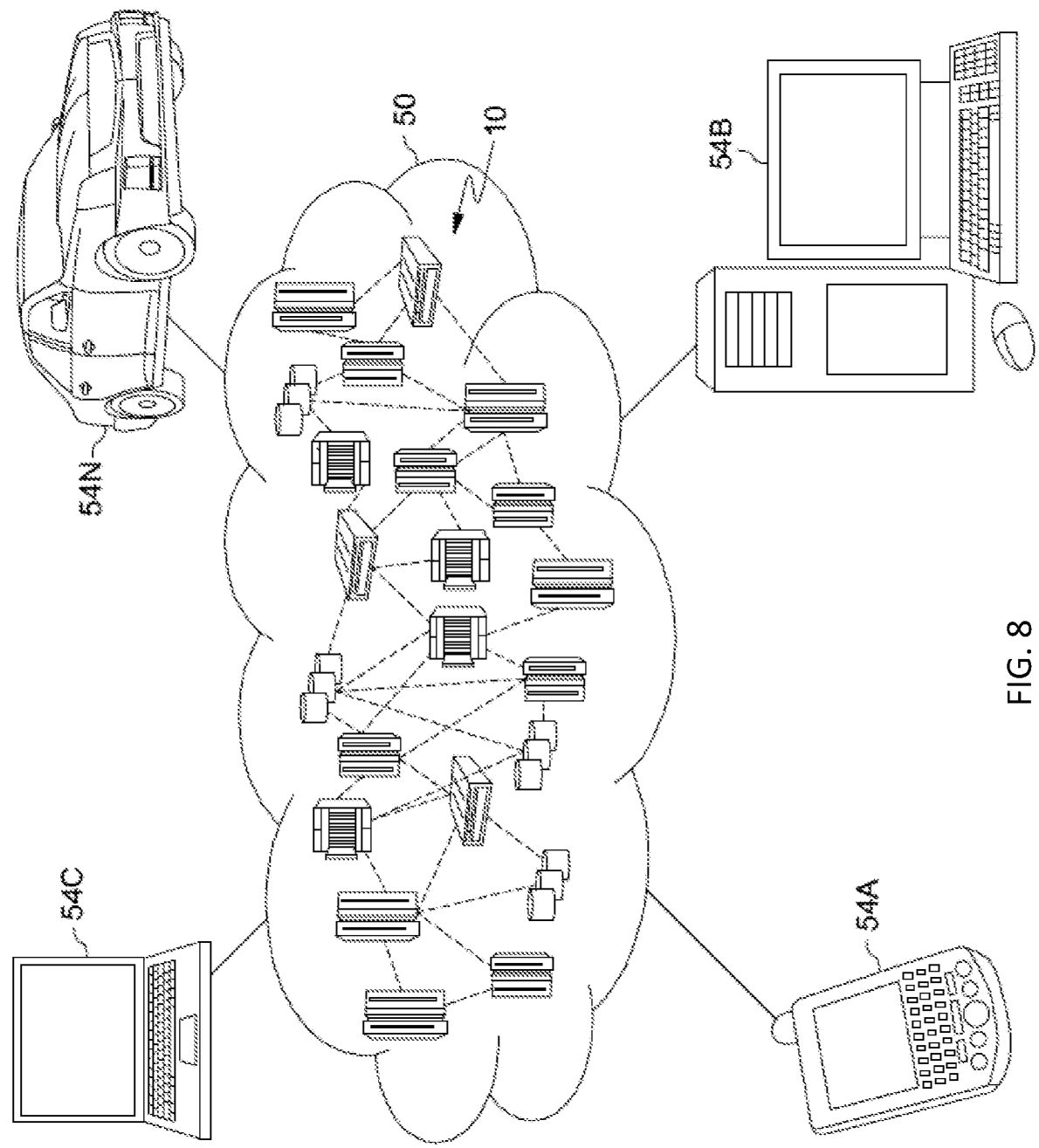
FIG. 8 depicts a cloud computing environment, in accordance with an embodiment of the present invention.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 9:
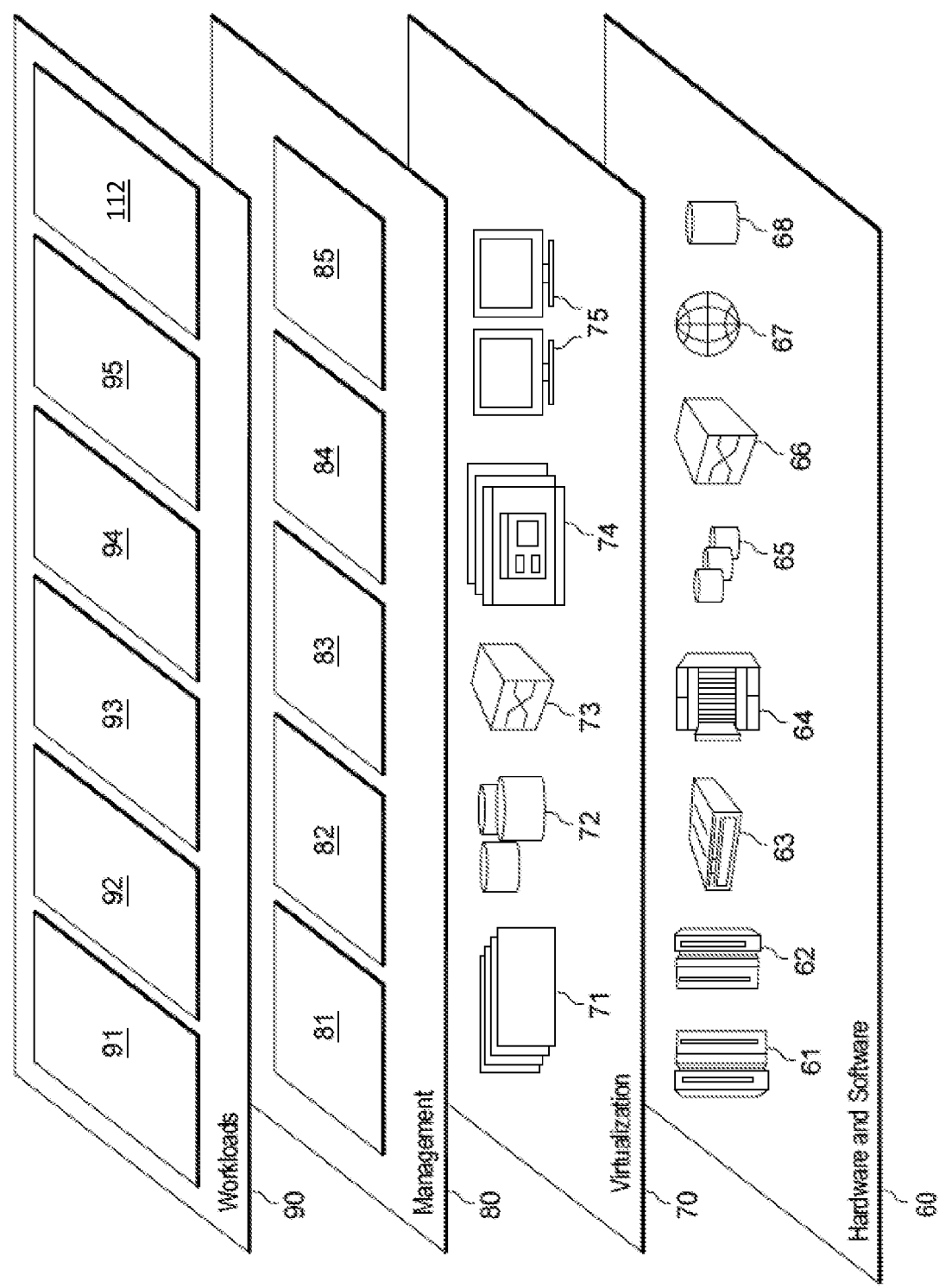
FIG. 9 depicts abstraction model layers, in accordance with an embodiment of the present invention.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 include hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and virtual fencing program 112.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
   activating a controller device associated with a first object and a secondary device associated with a second object;
   establishing a first virtual fence for the controller device and the secondary device, wherein the first virtual fence surrounds the secondary device and the controller device is positioned within the first virtual fence;
   receiving, from the controller device, a ping with location information for the controller device and the secondary device; and
   responsive to determining an adjustment to the first virtual fence is required, adjusting the first virtual fence based on a movement of the secondary device from a first location to a second location.

2. The computer-implemented method of claim 1, further comprising: establishing a second virtual fence for the controller device and another secondary device, wherein the second virtual fence surrounds the other secondary device and the controller device is positioned within the second virtual fence; and establishing an overall virtual fence for the controller device, the secondary device, and the other secondary device, wherein the overall virtual fence surrounds the first virtual fence and the second virtual fence.

3. The computer-implemented method of claim 1, further comprising: establishing a second virtual fence for another controller device and another secondary device, wherein the second virtual fence surrounds the other secondary device, and the other controller device is positioned within the second virtual fence; and establishing an overall virtual fence for the controller device, the secondary device, the other controller device, and the other secondary device, wherein the overall virtual fence surrounds the first virtual fence and the second virtual fence.

4. The computer-implemented method of claim 1, wherein adjusting the first virtual fence further comprises: determining a portion of the first virtual fence has crossed a static virtual fence, wherein the secondary device cannot cross the static virtual fence; and adjusting the first virtual fence to conform to the static virtual fence, wherein the controller device remains positioned within the first virtual fence.

5. The computer-implemented method of claim 1, further comprising: determining the first virtual fence was breached by the controller device; and sending a notification to a client device indicating the controller device is no longer in a vicinity of the secondary device; wherein the notification includes one or more user selectable options with regards to a breach by the controller device.

6. The computer-implemented method of claim 1, further comprising: receiving one or more parameters for the first virtual fence, wherein the one or more parameters are selected from a group consisting of: a shape, dimensions, a deviation timer, a deviation distance, and an activation period.

7. The computer-implemented method of claim 1, wherein the first object is a primary package of a shipment and the second object is a secondary package of the shipment, and wherein the primary package is to remain within a vicinity of the secondary package as defined by the first virtual fence for a duration of the shipment between an origin location and a destination location.

8. A computer program product comprising one or more non-transitory computer readable storage media and program instructions collectively stored on the one or more non-transitory computer readable storage media, the stored program instructions executable by one or more computer processors, the stored program instructions comprising:
   program instructions to activate a controller device associated with a first object and a secondary device associated with a second object;
   program instructions to establish a first virtual fence for the controller device and the secondary device, wherein the first virtual fence surrounds the secondary device and the controller device is positioned within the first virtual fence;
   program instructions to receive, from the controller device, a ping with location information for the controller device and the secondary device; and
   program instructions to, responsive to determining an adjustment to the first virtual fence is required, adjust the first virtual fence based on a movement of the secondary device from a first location to a second location.

9. The computer program product of claim 8, the stored program instructions further comprising: program instructions to establish a second virtual fence for the controller device and another secondary device, wherein the second virtual fence surrounds the other secondary device and the controller device is positioned within the second virtual fence; and program instructions to establish an overall virtual fence for the controller device, the secondary device, and the other secondary device, wherein the overall virtual fence surrounds the first virtual fence and the second virtual fence.

10. The computer program product of claim 8, the stored program instructions further comprising: program instructions to establish a second virtual fence for another controller device and another secondary device, wherein the second virtual fence surrounds the other secondary device, and the other controller device is positioned within the second virtual fence; and program instructions to establish an overall virtual fence for the controller device, the secondary device, the other controller device, and the other secondary device, wherein the overall virtual fence surrounds the first virtual fence and the second virtual fence.

11. The computer program product of claim 8, wherein program instructions to adjust the first virtual fence further comprises: program instructions to determine a portion of the first virtual fence has crossed a static virtual fence, wherein the secondary device cannot cross the static virtual fence; and program instructions to adjust the first virtual fence to conform to the static virtual fence, wherein the controller device remains positioned within the first virtual fence.

12. The computer program product of claim 8, the stored program instructions further comprising: program instructions to determine the first virtual fence was breached by the controller device; and program instructions to send a notification to a client device indicating the controller device is no longer in a vicinity of the secondary device; wherein the notification includes one or more user selectable options with regards to a breach by the controller device.

13. The computer program product of claim 8, the stored program instructions further comprising: program instructions to receive one or more parameters for the first virtual fence, wherein the one or more parameters are selected from a group consisting of: a shape, dimensions, a deviation timer, a deviation distance, and an activation period.

14. The computer program product of claim 8, wherein the first object is a primary package of a shipment and the second object is a secondary package of the shipment, and wherein the primary package is to remain within a vicinity of the secondary package as defined by the first virtual fence for a duration of the shipment between an origin location and a destination location.

15. A computer system comprising:
one or more computer processors;
one or more non-transitory computer readable storage media; and
program instructions stored on the non-transitory computer readable storage media for execution by at least one of the one or more computer processors, the program instructions comprising:
program instructions to activate a controller device associated with a first object and a secondary device associated with a second object;
program instructions to establish a first virtual fence for the controller device and the secondary device, wherein the first virtual fence surrounds the secondary device and the controller device is positioned within the first virtual fence;
program instructions to receive, from the controller device, a ping with location information for the controller device and the secondary device; and
program instructions to, responsive to determining an adjustment to the first virtual fence is required, adjust the first virtual fence based on a movement of the secondary device from a first location to a second location.

16. The computer system of claim 15, the stored program instructions further comprising: program instructions to establish a second virtual fence for the controller device and another secondary device, wherein the second virtual fence surrounds the other secondary device and the controller device is positioned within the second virtual fence; and program instructions to establish an overall virtual fence for the controller device, the secondary device, and the other secondary device, wherein the overall virtual fence surrounds the first virtual fence and the second virtual fence.

17. The computer system of claim 15, the stored program instructions further comprising: program instructions to establish a second virtual fence for another controller device and another secondary device, wherein the second virtual fence surrounds the other secondary device, and the other controller device is positioned within the second virtual fence; and program instructions to establish an overall virtual fence for the controller device, the secondary device, the other controller device, and the other secondary device, wherein the overall virtual fence surrounds the first virtual fence and the second virtual fence.

18. The computer system of claim 15, wherein program instructions to adjust the first virtual fence further comprises: program instructions to determine a portion of the first virtual fence has crossed a static virtual fence, wherein the secondary device cannot cross the static virtual fence; and program instructions to adjust the first virtual fence to conform to the static virtual fence, wherein the controller device remains positioned within the first virtual fence.

19. The computer system of claim 15, the stored program instructions further comprising: program instructions to determine the first virtual fence was breached by the controller device; and program instructions to send a notification to a client device indicating the controller device is no longer in a vicinity of the secondary device; wherein the notification includes one or more user selectable options with regards to a breach by the controller device.

20. The computer system of claim 15, the stored program instructions further comprising:
program instructions to receive one or more parameters for the first virtual fence, wherein the one or more parameters are selected from a group consisting of: a shape, dimensions, a deviation timer, a deviation distance, and an activation period.

\* \* \* \* \*